United States Patent [19]

Kawamura

[11] Patent Number: 4,694,653

[45] Date of Patent: Sep. 22, 1987

[54] ENGINE ENERGY RECOVERY APPARATUS

[75] Inventor: Hideo Kawamura, Samukawa, Japan

[73] Assignee: Isuzu Motors Limited, Tokyo, Japan

[21] Appl. No.: 921,760

[22] Filed: Oct. 22, 1986

[30] Foreign Application Priority Data

Oct. 29, 1985 [JP] Japan .................................. 60-241871

[51] Int. Cl.⁴ ........................ F01D 15/10; F02G 5/00
[52] U.S. Cl. ........................................ 60/597; 290/52
[58] Field of Search ................... 60/597, 598, 607, 608; 290/52

[56] References Cited

U.S. PATENT DOCUMENTS 2,432,177 12/1947 Sedille ............................. 290/52 X
4,219,738 8/1980 Griesinger ........................ 290/52 X

FOREIGN PATENT DOCUMENTS 141634  5/1985  European Pat. Off. ............. 60/597
0159146 10/1985 European Pat. Off. .
197483  4/1908  Fed. Rep. of Germany .
663976  8/1938  Fed. Rep. of Germany .
1040839 10/1958 Fed. Rep. of Germany .
141712  8/1984  Japan ............................... 60/608

Primary Examiner—Michael Koczo
Attorney, Agent, or Firm—Staas Halsey

[57] ABSTRACT

An engine energy recovery apparatus is described including an exhaust turbine and a generator provided in the exhaust pipe of an engine. Temperature sensors are provided for sensing exhaust temperature at the inlet and outlet of the exhaust turbine, as well as a speed sensor for sensing the rotational speed of the exhaust turbine. The efficiency of the exhaust turbine is computed based on signals from these sensors, and the load on the generator is adjusted so that the exhaust turbine will run at maximum efficiency at all times.

4 Claims, 4 Drawing Figures

ENGINE ENERGY RECOVERY APPARATUS

BACKGROUND OF THE INVENTION

This invention relates to an apparatus for recovering exhaust energy contained in the exhaust gas of an engine. More particularly, the invention relates to an engine energy recovery apparatus for operating, at high efficiency, an exhaust turbine having a generator, thereby improving the exhaust energy recovery efficiency.

Engines having an adiabatic structure have recently come into use. These engines employ an adiabatic material such as a ceramic for constructing engine components like the combustion chambers and exhaust pipe. With engines of this type, it is unnecessary to cool the engine by dissipating the internally generated heat. The energy possessed by the high-temperature exhaust gas, produced by the engine, is recovered and fed back to the engine output shaft, axles and the like to enhance engine output.

One known method of recovering exhaust energy is to reduce the rotational force of a turbine, which is rotated by the exhaust gas, by using a multiple-stage gear mechanism to drive the engine crankshaft.

Another proposal is to effect a series connection between an exhaust turbine having a generator and an exhaust turbine having a compressor for intake, and supply the output of the generator to a motor provided on the engine output shaft, thereby enabling the exhaust energy to be recovered.

Still another proposal is to provide an exhaust bypass circuit; effect the series connection between the exhaust turbine having the generator and the exhaust turbine having the compressor for intake; supply the output of the generator to a motor provided on the engine output shaft; drive the compressor; and control the amount of exhaust that passes through the exhaust bypass circuit, thereby running the engine in an ideal state. These proposals have been disclosed in the specification of Japanese Patent Application Laid-Open (Kokai) No. 59-141712, which describes an engine equipped with an exhaust energy recovery apparatus.

The first method described above of driving the crankshaft by relying upon the gear mechanism involves certain problems. Specifically, the transfer efficiency of one stage of the gear mechanism ordinarily is 90-95%, so that there is a decline in efficiency of about 80% with a three-stage gear mechanism. Furthermore, the rotational speed of an exhaust turbine is a high 10,000 rpm. Reducing this speed requires a gear mechanism having a greater number of stages, thus resulting in a much lower transfer efficiency and a greater amount of frictional loss. Moreover, since the rotational speed of the exhaust turbine is made to accommodate the rotational speed of the engine, optimum engine turbine performance cannot be achieved.

On the other hand, with the proposals described in Japanese Patent Application Laid-Open (Kokai) No. 59-141712, the engine is run in the ideal state by controlling the amount of exhaust gas flowing through the exhaust bypass circuit on the basis of data received from an engine velocity sensor and an engine load sensor. However, no control is performed to optimize the rotational speed of the exhaust turbine or the efficiency of the turbine.

SUMMARY OF THE INVENTION

An object of the present invention is to provide an energy recovery apparatus for an engine having an adiabatic structure equipped with an exhaust turbine, the apparatus being adapted to control the efficiency of the exhaust turbine to achieve an optimum state so that the energy possessed by the exhaust gas can be recovered efficiently.

Another object of the present invention is to provide an energy recovery apparatus of the above-described type, in which the load of a generator, provided in an exhaust pipe, is controlled based on signals from temperature sensors, provided at the inlet and outlet of the exhaust turbine, for sensing exhaust gas temperature, and a signal from a speed sensor for sensing the rotational speed of the exhaust turbine.

According to the present invention, there is provided an engine energy recovery apparatus including an exhaust turbine and a generator provided in an exhaust pipe of an engine, whose combustion chambers and exhaust pipe are of an adiabatic structure; first and second temperature sensors for sensing exhaust gas temperature at an inlet and outlet, respectively; of the exhaust turbine, a speed sensor for sensing the rotational speed of the exhaust turbine; and means for controlling the load of the generator in response to a signal from each of the sensors, whereby the exhaust turbine is run in an optimum state and the engine is operated at high efficiency.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

The present invention will now be described in detail with reference to the accompanying drawings.

Figure 1:
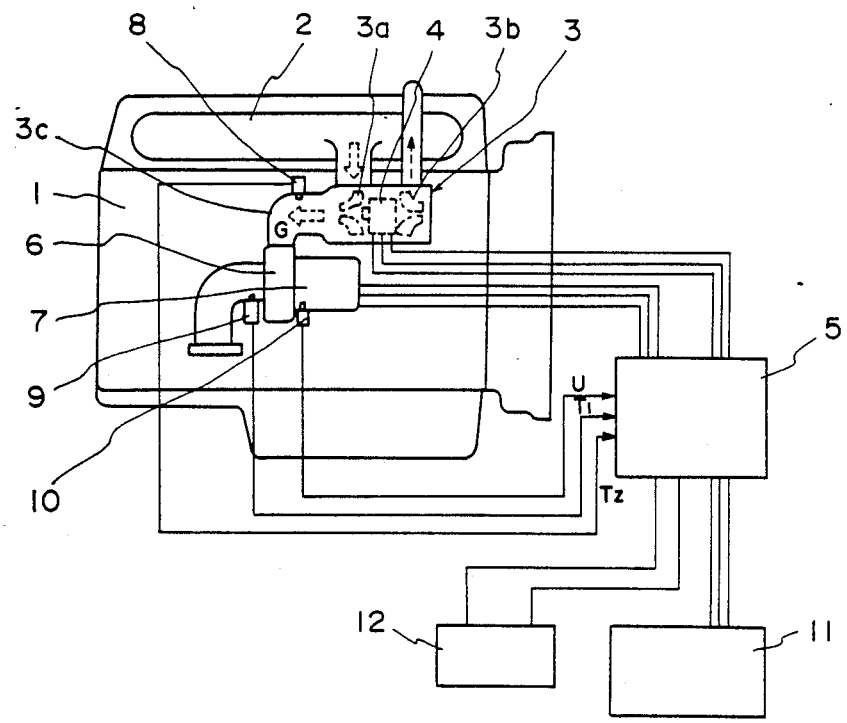
FIG. 1 is a schematic view illustrating an embodiment of the present invention.

FIG. 1 is a schematic view illustrating an embodiment of an engine energy recovery apparatus according to the present invention.

In FIG. 1, an engine 1 having an adiabatic structure employs a ceramic as the material constituting such components as the cylinder liners, cylinder head insulator plates, exhaust valves, pistons, etc. The engine 1 has an exhaust manifold 2 the outer wall of which is composed of a ceramic. Connected to the exhaust manifold 2 is a turbocharger 3 having a turbine blade 3a driven by exhaust gas emitted from the exhaust manifold 2, a compressor blade 3b connected directly to the rotary shaft of the turbine blade 3a, and a motor-generator 4 having a rotor also connected directly to the turbine blade rotary shaft. The rotor of the motor generator includes a permanent magnet, with an opposing stator having windings disposed thereon. When the turbine blade 3a is rotated at high speed by the energy of the exhaust gas, the compressor 3b compresses intake air and supercharges the engine 1. At the same time, an alternating current is induced in the windings of the stator and is delivered to a control unit 5 connected thereto.

The turbocharger 3 has a discharge port 3c to which an exhaust turbine 6 is connected. The exhaust turbine 6 is driven by the turbine blade 3a and, further, by exhaust gas G having residual energy. The exhaust turbine 6 has a rotary shaft directly connected to the rotary shaft of a generator 7 attached thereto, whereby the energy of the exhaust gas G is recovered by being converted into electrical energy.

A first temperature sensor 8 is mounted in the discharge port 3c of turbocharger 3 for sensing the temperature of the exhaust gas G that flows into the exhaust turbine 6. The sensor 8 provides the control unit 5 with a signal Tz indicative of the temperature sensed. A second temperature sensor 9 is mounted in the outlet of the exhaust turbine 6 and provides the control unit 5 with a signal T1 indicative of the temperature at the exhaust turbine outlet. A speed sensor 10 is mounted on the exhaust turbine 6 for sensing the rotational speed of the turbine shaft of exhaust turbine 6. The speed sensor 10 produces a signal U indicative of the sensed speed and delivers the signal to the control unit 5.

An AC motor 11 receives the outputs of the motor generator 4 and generator 7, which arrive via the control unit 5 when the generators 4, 7 operate. By way of example, the exhaust energy can be recovered by coupling the output shaft of the engine 1 and the rotary shaft of the AC motor 11 to assist the driving force of the engine 1.

A battery 12 supplies the control unit 5 with a direct current. The control unit 5 converts this direct current into AC power of a predetermined frequency and delivers the AC power to the motor generator 4, thereby driving the compressor blade 3b so that supercharging of the intake air may take place when the engine 1 is rotating at low speed under a high load.

Figure 2:
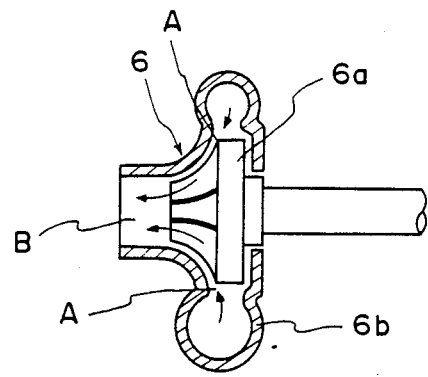
FIG. 2 is a cross sectional, schematic view of an exhaust turbine.
Figure 3:
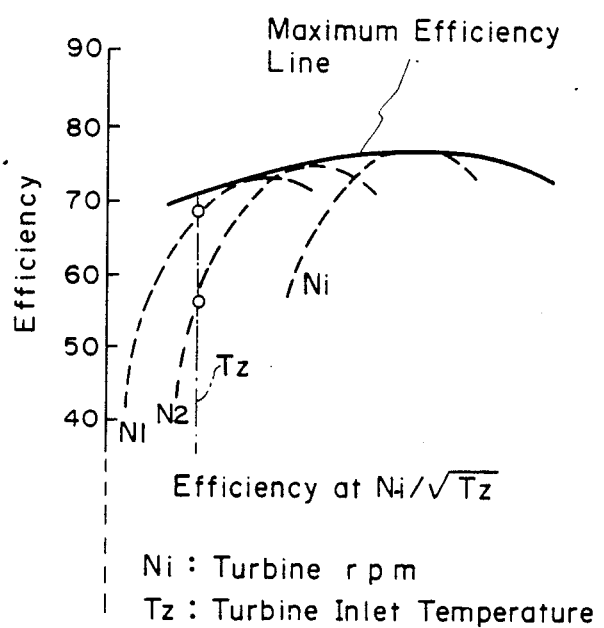
FIG. 3 is a graph illustrating an example of turbine efficiency.

FIG. 2 is a cross sectional, schematic view of an exhaust turbine, and FIG. 3 is a graph showing an example of turbine efficiency. In FIG. 2, a turbine blade 6a is driven by the energy of exhaust gas which reaches an outlet B upon being injected from a nozzle A between the turbine blade 6a and a scroll 6b. It is known that maximum efficiency is obtained when the ratio of turbine speed U to an adiabatic expansion rate Cad attained due to adiabatic expansion at the nozzle A is expressed as follows:

$$U/Cad = 0.7 \quad (1)$$

As shown in the graph of FIG. 3, efficiently at a rotational speed of N2 is about 55%. However, when the load on the generator 7 increases and the rotational speed of the exhaust turbine falls to N1, an efficiency of about 70% is obtained.

The control unit 5 is constituted by a microcomputer and has a processor, a memory section including such memories as a ROM and a RAM, and an input/output section. When the inflow temperature signal Tz, outlet temperature signal T1 and speed signal U arrive, the control unit 5 executes processing based on prescribed data and a predetermined arithmetic expression stored previously in the ROM, thereby issuing predetermined commands to effect control. The architecture for accomplishing this is well-known and need not be described in detail here.

Figure 4:
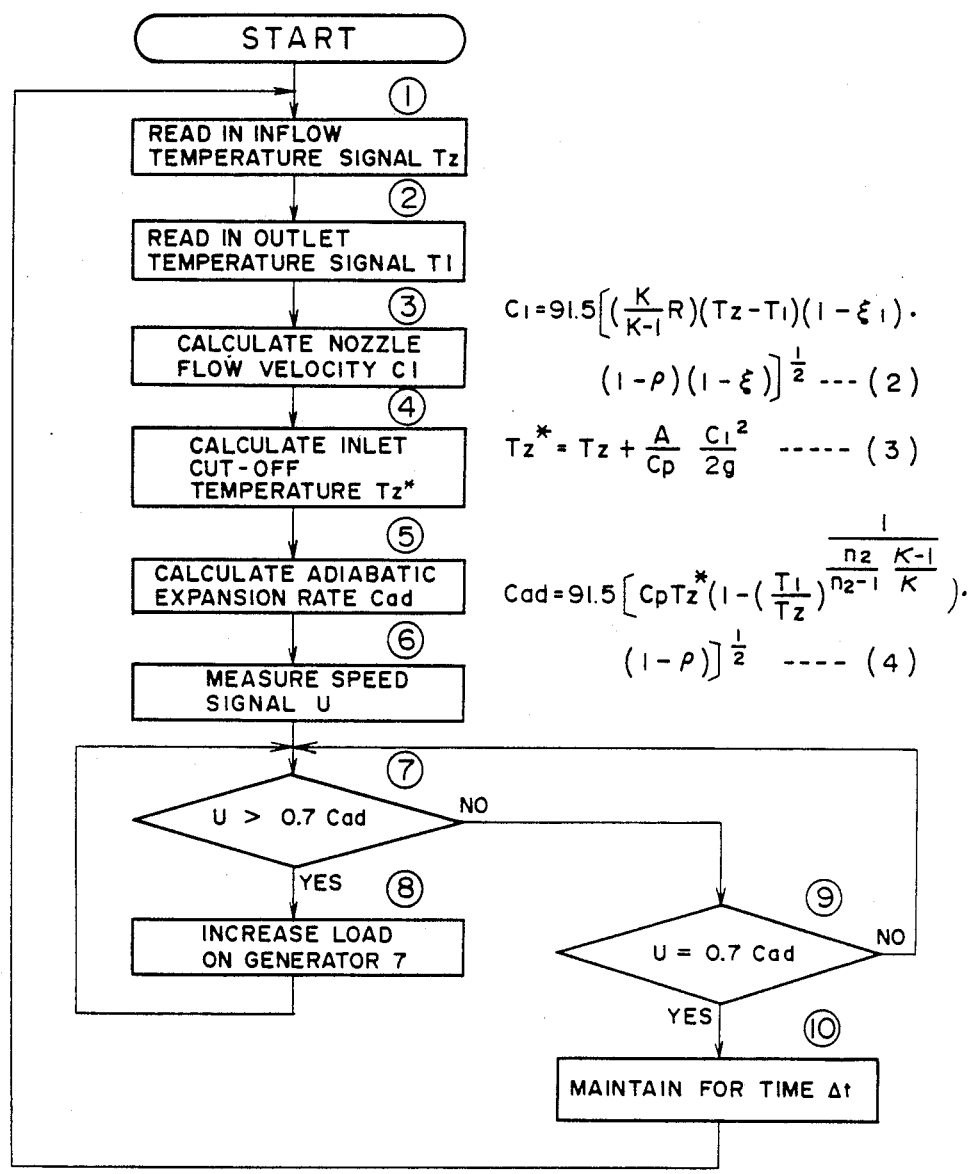
FIG. 4 is a processing flowchart showing an example of processing according to the present invention.

FIG. 4 is a processing flowchart illustrating an example of processing in accordance with the present invention.

Steps 1 and 2 of the flowchart call for the inflow temperature signal Tz and the outlet temperature signal T1 to be read in the memory section of control unit 5 from the first temperature sensor 8 and second temperature sensor 9, respectively, provided on the exhaust turbine 6. In step 3, the control unit 5 calculates the value of a nozzle flow velocity C1 in accordance with the following equation:

$$C1 = \\ 91.5 \left[ \left( \frac{K}{K-1} R \right) (Tz - T1)(1 - \xi_1) \times (1 - p)(1 - \xi_1) \right]^{\frac{1}{2}} \quad (2)$$

where K/K-1 is a constant, e.g. a value of 0.251; $\xi_1$ represents a coefficient for loss at the nozzle, e.g. a value of 0.08; p denotes the degree of reaction, e.g. a value of 0.4 to 0.5; and R stands for a gas constant.

Next, step 4 calls for the control unit 5 to obtain Tz* by performing a turbine inlet cut-off temperature calculation in accordance with the following equation:

$$Tz^* = Tz + \frac{A}{Cp} \frac{C1^2}{2g} \quad (3)$$

where Cp represents mean constant pressure specific heat, e.g. a value of 0.272, and $A \cdot C1^2/2g$ stands for the kinetic energy at the nozzle outlet.

Next, at step 5, the control unit 5 calculates the adiabatic expansion rate Cad in accordance with the following equation using the value of Tz* found from Eq. (3):

$$Cad = 91.5 \left[ Cp\, Tz^*(1 - \left(\frac{T1}{Tz}\right)^{\frac{n2}{n2-1}\frac{K-1}{K}})(1 - P) \right]^{\frac{1}{2}} \quad (4)$$

This is followed by step 6, at which the control unit 5 measures the speed signal U from the speed sensor 10 provided on the exhaust turbine 6; step 7, at which the value of the speed signal U is compared with the value of Cad calculated at step 5; and step 8, at which the load on the generator 7 is increased to reduce the rotational speed of the exhaust turbine 6 if it is determined at step 7 that the speed signal U is greater than 0.7 Cad. From step 8 the program returns to step 7.

If it is determined at step 7 that U is not greater than 0.7 Cad, then the program proceeds to step 9, at which it is determined whether U is equal to 0.7 Cad. If the answer is YES, then this state is maintained for a predetermined period of time $\Delta t$ at step 10, after which the program returns to step 1. If U is found to be less than 0.7 Cad (i.e., NO at step 9), then the program returns to step 7. U is then remeasured and compared with 0.7 Cad.

Thus, the nozzle flow velocity and turbine inlet cut-off temperature are calculated based on the signals indicative of the inlet and outlet temperatures of the exhaust turbine 6, the adiabatic expansion rate is calculated, and the exhaust turbine 6 is operated by controlling the load on the generator 7 in such a manner that the turbine speed U takes on a value of 0.7 Cad.

As many apparently widely different embodiments of the present invention can be made without departing from the spirit and scope thereof, it is to be understood that the invention is not limited to the specific embodiments thereof except as defined in the appended claims.

What we claim is:

1. A apparatus for recovering exhaust energy from an exhaust turbine rotated by exhaust gas produced in an engine, comprising:
   (a) an exhaust turbine provided at an exhaust port of the engine;
   (b) a generator rotated by said exhaust turbine;
   (c) a first temperature sensor for sensing exhaust temperature at an inlet of said exhaust turbine;
   (d) a second temperature sensor for sensing exhaust temperature at an outlet of said exhaust turbine;
   (e) a speed sensor for sensing rotational speed of said exhaust turbine;
   (f) first means for determining exhaust turbine efficiency based on signals from said first and second temperature sensors and said speed sensor; and
   (g) second means for adjusting a load on said generator so as to maximize the exhaust turbine efficiency determined by said first means.

2. The apparatus according to claim 1, wherein maximum efficiency of the exhaust turbine is computed in accordance with the equation $$U/Cad = 0.7$$

where U represents turbine speed and Cad represents an adiabatic expansion rate.

3. The apparatus according to claim 1, wherein the load on the generator is a battery.

4. The apparatus according to claim 1, wherein a plurality of energy recovery apparati having the exhaust turbine and the generator rotated thereby is serially connected with respect to the exhaust port of the engine.

* * * * *